United States Patent [19]

Mizuno et al.

[11] 4,413,095
[45] Nov. 1, 1983

[54] VINYLIDENE FLUORIDE RESIN-BASED SHAPED PRODUCT

[75] Inventors: Toshiya Mizuno; Naohiro Murayama, both of Iwaki, Japan

[73] Assignee: Kureha Kagaku Kogyo Kabushiki Kaisha, Tokyo, Japan

[21] Appl. No.: 442,436

[22] Filed: Nov. 17, 1982

[30] Foreign Application Priority Data

Nov. 20, 1981 [JP] Japan .................... 56-186234

[51] Int. Cl.³ .................... C08L 27/16; C08L 33/08; C08L 33/14
[52] U.S. Cl. .................... 525/199
[58] Field of Search .................... 525/199

[56] References Cited

U.S. PATENT DOCUMENTS

| | | | |
|---|---|---|---|
| 3,159,646 | 12/1964 | Millionis et al. | 525/201 |
| 3,324,069 | 6/1967 | Koblitz et al. | 525/199 |
| 3,458,391 | 7/1969 | Hartley | 525/199 |

Primary Examiner—Carman J. Seccuro
Attorney, Agent, or Firm—Wenderoth, Lind & Ponack

[57] ABSTRACT

A vinylidene fluoride resin composition is obtained by mixing into a vinylidene fluoride resin a copolymer of a monomer (A) having the formula:

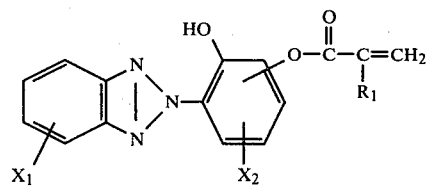

wherein $R_1$ is H or $CH_3$, and $X_1$ and $X_2$ are each a saturated hydrocarbon group containing from 1 to 4 carbon atoms, H or halogen, and a monomer (B) having the formula:

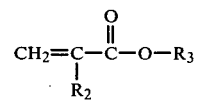

wherein $R_2$ is H or $CH_3$ and $R_3$ is a saturated hydrocarbon group containing from 1 to 5 carbon atoms. Shaped products, particularly films obtained from this composition exhibit excellent ultraviolet shielding off effect and excellent transparency.

9 Claims, 2 Drawing Figures

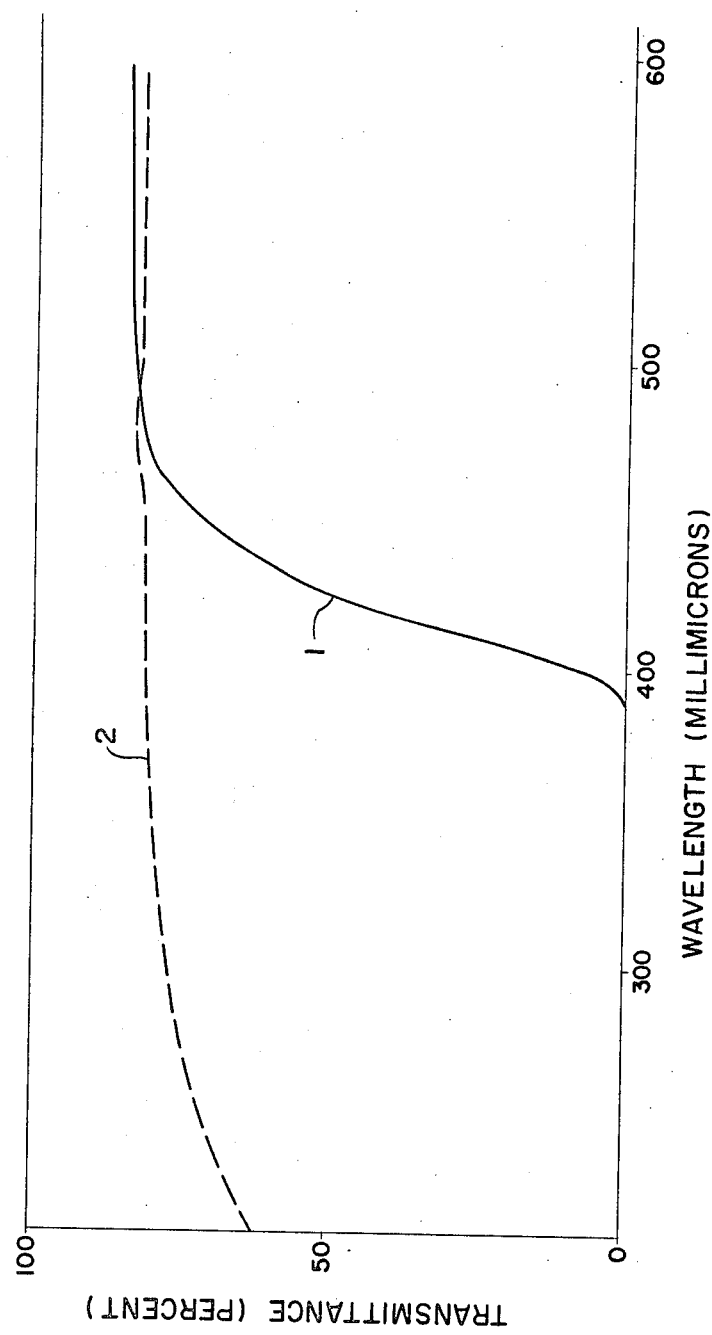

VINYLIDENE FLUORIDE RESIN-BASED SHAPED PRODUCT

BACKGROUND OF THE INVENTION

The present invention relates to a transparent, vinylidene fluoride resin-based shaped product exhibiting an effect of shielding off ultraviolet rays.

Many organic polymers such as polyethylene, polypropylene, polyvinyl chloride, saturated and unsaturated polyesters, and polycarbonate gradually deteriorate on exposure to sunlight, and certain polymers exhibit an undesirable discoloration. This phenomenon results from the fact that these polymers are very sensitive to the ultraviolet rays in sunlight, particularly light at wavelengths of from 290 to 400 millimicrons. In contrast, vinylidene fluoride resins, particularly polyvinylidene fluoride have a very high resistance to ultraviolet rays. The vinylidene fluoride resins are characterized by the fact that no deterioration takes place therein even when the resins are exposed to sunlight for a long period of time.

However, when some substance is packaged with films of a vinylidene fluoride resin, the substance cannot be protected from light deterioration. When a substrate is coated with a film of a vinylidene fluoride resin, there is also hardly any protection of the substrate. This is because, at the same time that a vinylidene fluoride resin has ultraviolet ray resistance, it also has an extremely high transmittance of ultraviolet rays.

Generally, it is well known that the light deterioration of a substance packaged or coated with polymers having large transmittance of ultraviolet rays can be decreased by mixing an ultraviolet absorber into the polymers. However, when an ultraviolet absorber disclosed in Japanese Patent Pub. NO. 11224/1962, for example, is added to polyvinylidene fluoride, it is difficult to completely mix the absorber with polyvinyl fluoride. Similarly, other general commercially available ultraviolet absorbers cannot be completely admixed with polyvinylidene fluoride.

Because polyvinylidene fluoride has a high crystallinity, the processing temperature is relatively high and the compatibility with most compounds is poor. When a general-type ultraviolet absorber is added to polyvinylidene fluoride, the ultraviolet absorber having a high vapor pressure is liable to vaporize off during the processing. Even if the absorber can be made to remain in the polyvinylidene fluoride by adding a large amount of the absorber, the absorber tends to become isolated gradually from polyvinylidene fluoride to bleed over or leach out of the surface of the polyvinylidene fluoride.

Accordingly, the property of shielding off ultraviolet rays of the shaped product in which the ultraviolet absorber is admixed into polyvinylidene fluoride gradually decreases with the elapse of time. When an absorber having poor compatability is mixed with polyvinylidene fluoride, the transparency of polyvinylidene fluoride is decreased.

In order to solve such problems, Japanese Patent Pub. No. 48897/1977 has proposed a polyvinylidene fluoride composition in which a copolymer of 2-hydroxy-4-(4-methacryloxy-2-hydroxypropoxy)benzophenone and methyl methacrylate or ethyl methacrylate is used as an ultraviolet absorber.

However, this composition is slightly unsatisfactory in transparency. Further, the compatibility of this ultraviolet absorber with polyvinylidene fluoride is still insufficient, and therefore a large amount of the ultraviolet absorber cannot be mixed into polyvinylidene fluoride. When the thickness of a thin film formed from such composition is, for example, several microns it is impossible to completely shield off ultraviolet rays by means of such a thin film. Because polyvinylidene fluoride is an expensive resin, it is desired that the thickness of the film be thin in order that it can be widely used in various industries.

SUMMARY OF THE INVENTION

An object of the present invention is to provide a transparent shaped product which exhibits an excellent effect of shielding off ultraviolet rays and which can be obtained from a vinylidene fluoride resin-based composition by using a high-molecular-weight ultraviolet absorber very compatible with the vinylidene fluoride resin.

The present invention is directed to a vinylidene fluoride resin-based shaped product obtained from a composition comprising 100 parts by weight of vinylidene fluoride resin and from 1 to 200 parts by weight of a copolymer comprising a mononer (A) having the formula:

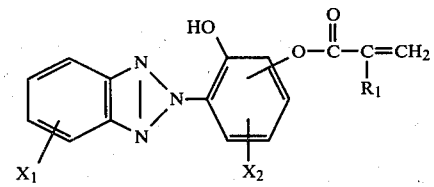

wherein $R_1$ is H or $CH_3$, and $X_1$ and $X_2$ are each a saturated hydrocarbon group containing from 1 to 4 carbon atoms, H or halogen and a mononer (B) having the formula:

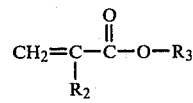

wherein $R_2$ is H or $CH_3$, and $R_3$ is a saturated hydrocarbon group containing from 1 to 5 carbon atoms, the molar ratio of said monomer (A) to the monomer (B) being not more than 1, and the mononer (A) which is a constituent unit of said copolymer being present in an amount of at least $1 \times 10^{-4}$ moles per square meter of light-receiving area of said shaped product.

The nature, utility and further features of the present invention will be more clearly understood from the following detailed description when read in conjunction with the accompanying drawings.

BRIEF DESCRIPTION OF THE DRAWINGS

In the drawings:

FIG. 2 is a graph of absorption curves at ultraviolet and visible regions for films obtained from the composition of the present invention and polyvinylidene fluoride alone, respectively.

DETAILED DESCRIPTION OF THE INVENTION

Figure 1:
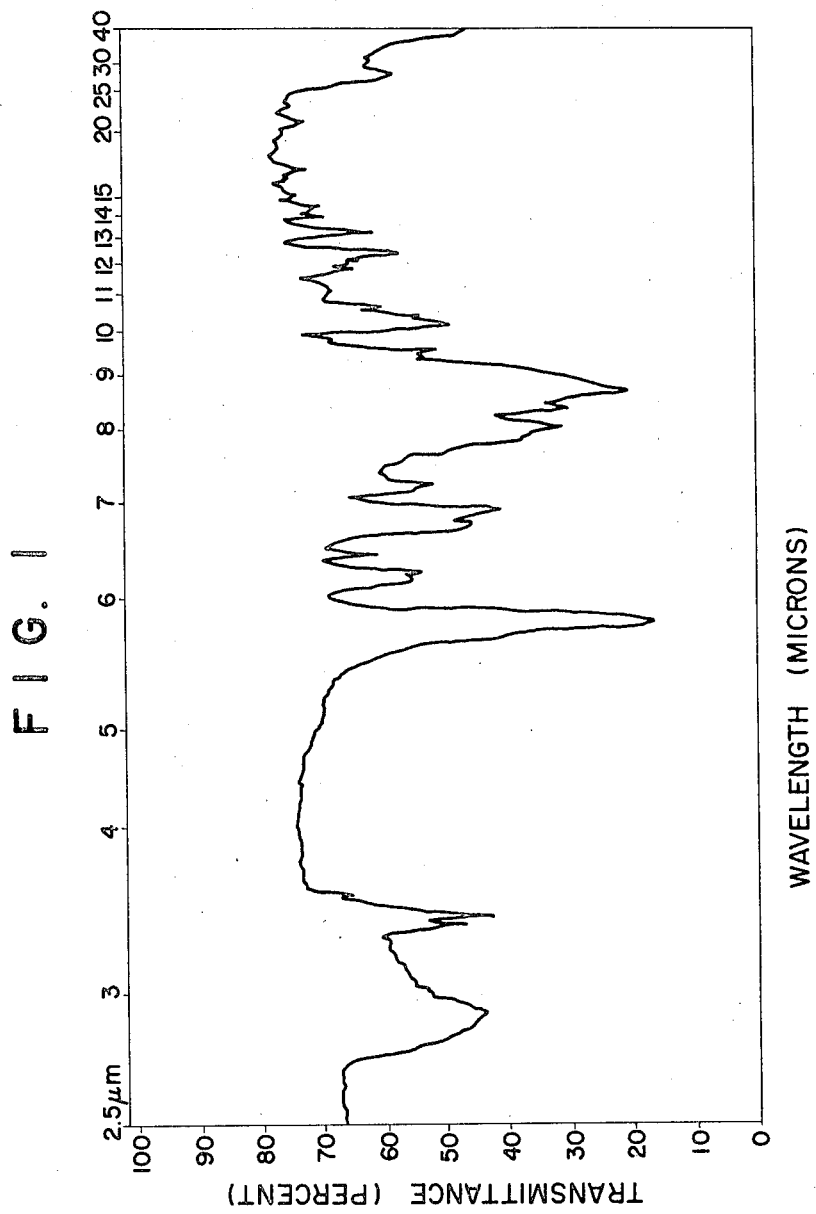
FIG. 1 is a chart of an infrared absorption spectrum of a high-molecular-weight ultraviolet absorber used in a composition of one example according to the present invention.

The composition from which a shaped product of the present invention is prepared is obtained by mixing into a vinylidene fluoride resin a copolymer as a high-molecular-weight ultraviolet absorber, the copolymer being obtained by copolymerizing a monomer (A) having the formula:

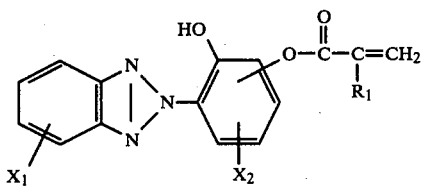

wherein $R_1$ is H or $CH_3$, and $X_1$ and $X_2$ are each a saturated hydrocarbon group containing from 1 to 4 carbon atoms, H or halogen, with a mononer (B) having the formula:

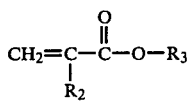

wherein $R_2$ is H or $CH_3$ and $R_3$ is a saturated hydrocarbon group containing from 1 to 5 carbon atoms.

The copolymer comprising the monomer (A) and the monomer (B) and having a number-average degree of polymerization in the range of from 10 to 5,000 (by the osmotic pressure measurement) can be obtained according to a conventional polymerization process. While the copolymer having a degree of polymerization in the range as stated above can be used in the present invention, it is preferable to use a copolymer having a degree of polymerization of from 50 to 3,000, and more preferably from 100 to 2,000. If the degree of polymerization is lower, than bleeding over a surface of the shaped product tends to relatively increase. If the degree of polymerization is higher, then the material is difficult to mold.

In order to shield off ultraviolet rays, it is necessary that the monomer (A) which is a constituent unit of the copolymer be present in an amount of at least $1 \times 10^{-4}$ moles per square meter of light-receiving area of the shaped product. Preferably, the monomer (A) is present in an amount of at least $5 \times 10^{-4}$ moles/m², and more preferably at least $1 \times 10^{-3}$ moles/m².

The copolymer comprising the monomer (A) and the monomer (B) is uniformly miscible with a vinylidene fluoride resin. In order to obtain a transparent composition, it is necessary that the molar ratio of the monomer (A) to the monomer (B) be not more than 1. Preferably, the molar ratio of the monomer (A) to the monomer (B) is from 1/1000 to ½, and more preferably from 1/100 to ⅓.

The copolymers comprising the monomer (A) and the monomer (B) are not limited to the copolymers consisting of the monomer (A) and the monomer (B). The copolymer may contain a small amount of other monomer units which are copolymerizable with the monomers (A) and (B). Examples of such monomers are vinylidene fluoride, vinyl fluoride, ethylene, vinyl chloride, vinylidene chloride, isobutylene vinyl acetate, methyl acrylate, methyl methacrylate, butyl methacrylate, acrylic acid, and methacrylic acid. However, a copolymer consisting of only the monomer (A) and the monomer (B) is preferably used.

The above mentioned high molecular-weight ultraviolet absorber is compatible with a vinylidene fluoride resin and can be mixed with a vinylidene fluoride resin in a wide range of ratios. The high-molecular weight ultraviolet absorber is mixed into the vinylidene fluoride resin in a quantity of from 1 to 200 parts by weight per 100 parts by weight of a vinylidene fluoride resin. The addition of less than 1 part by weight does not impart a sufficient ultraviolet shielding off effect to the vinylidene fluoride resin, whereas the addition of more than 200 parts by weight is unnecessary from the standpoint of ultraviolet shielding off effect and rather tends to impair the mechanical properties of the vinylidene fluoride resin. An even more preferable quantity of the high-molecular-weight ultraviolet absorber added is within the range of from 2 to 100 parts by weight.

The monomer (A) having the effect of absorbing ultraviolet rays is disclosed in U.S. Pat. No. 3,159,646 and can be formed according to the process disclosed therein. The copolymerization of the monomer (A) with the monomer (B) can be readily carried out according to a general radical polymerization method.

The vinylidene fluoride resins for use herein include polyvinylidene fluoride having a number-average degree of polymerization of 800 to 8000, for example, those marketed under the trade names of Kureha KF Polymer (Kureha Kagaku Kogyo K.K., Japan) and Kynar (Pennwalt Corporation). Examples of the vinylidene fluoride resin are homopolymer of vinylidene fluoride and copolymers containing at least 70 mole % of polyvinylidene fluoride provided that the copolymers have characteristics similar to those of the homopolymer. Examples of comonomers which are copolymerizable with vinylidene fluoride are ethylene tetrafluoride, propylene hexafluoride, ethylene chloride trifluoride, and vinyl fluoride.

The composition as described above can be easily molded by means of general heat processing methods such as extrusion, injection, compression and blow molding methods into films, sheets, tubes, filaments and the like. Alternatively, the composition may be applied as a coating in the form of a solution or a dispersion. Particularly, a film product of from 2 to 500 microns in thickness is transparent and has excellent weatherability and the effect of shielding off ultraviolet rays up to 390 millimicrons near the ultraviolet region.

Accordingly, when a material which is easily caused to deteriorate by ultraviolet rays is packaged or coated with the shaped product of the present invention, the deterioration of the material can be remarkably inhibited and great advantages can be obtained by this film product in various industries. Further, the film product of the present invention can be conveniently used as hot-house covering material for agriculture.

In order to indicate more fully the nature and utility of this invention, the following specific examples of practice constituting preferred embodiments of the invention and a comparison example are set forth, it being understood that these examples are presented as illustrative only and are not intended to limit the scope of the invention.

Throughout these examples, quantities expressed in "parts" are by weight unless otherwise specified.

PREPARATION EXAMPLE (Production of Monomer (A))

First, 69.4 g of 2-nitro-5-chloroaniline was dissolved in 320 cc of concentrated hydrochloric acid to form a hydrochloride thereof. The reaction mixture was cooled to a temperature of about 0° C. While the temperature was maintained at about 0° C., 27.6 g of sodium nitrite dissolved in a minimal quantity of water was added dropwise to form a first solution.

Separately, 44 g of resorcinol and 120 cc of concentrated hydrochloric acid were added to 2 liters of water, and the reaction mixture was cooled to a temperature of about 0° C. to form a second solution.

The first solution was added to the second solution with stirring. After this addition, a red slurry was obtained. The red slurry was subjected to filtration and dehydration. The product thus obtained was then washed with water several times to obtain a reddish brown solid matter. This solid matter was dissolved in 3 liters of an aqueous solution containing about 100 g of caustic soda. Zinc was added, and the stirring was continued at a temperature of about 50° C. until the solid matter was completely reduced.

The reaction mixture was cooled and filtered. The filtrate was neutralized with concentrated hydrochloric acid, and a small amount of hydrochloric acid was further added to form a mixture having an acidic pH. The reaction mixture was heated for a short period of time, and the neutralized product was filtered off and washed with water.

The crude product thus obtained was recrystallized twice from an ethanol-water system to purify it. Then, 26.1 g of the product thus prepared was dissolved in ethanol, and the resulting solution was cooled to a temperature of from 0° to 5° C. While this solution was stirred, 9.0 g of acrylic chloride was added dropwise to the solution. After this addition, the stirring was continued to form precipitates. The precipitates were then filtered off, washed with ethanol, and dried to obtain 2-(2'-hydroxy-4'-acryloxyphenyl)-5-chlorobenzotriazole, i.e., a monomer (A).

EXAMPLE 1

The 2-(2'-hydroxy-4'-acryloxyphenyl)-5-chlorobenzotriazole (monomer (A)) obtained in the Preparation Example can be copolymerized with methyl methacrylate (monomer B)) in various proportions. A representative example wherein the weight ratio of monomer (A) to monomer (B) is 1:2 (the molar ratio is 1:5.81) is set forth below.

The polymerization was carried out as described hereinbelow.
Composition charged:
  Monomer (A): 20 parts
  Monomer (B): 40 parts
  Deionized Water: 150 parts
  Polyvinyl alcohol (suspending agent): 0.1 part
  Azobisisobutyronitrile (initiator): 0.25 part
  Dodecylmercaptan (chain transfer agent): 0.15 part The monomer (A) was mixed with the monomer (B), and then the initiator and the chain transfer agent were dissolved in the resulting mixture. This solution was dispersed into an aqueous solution in which the suspending agent had been previously dissolved. The space of the system was then purged with nitrogen gas, and the solution was stirred vigorously to obtain ample dispersion and suspension. The resulting dispersion was then heated to a temperature of 60° C. thereby to copolymerize the mononer (A) with the monomer (B) for about 8 hours.

After completion of the copolymerization, the resulting copolymer was removed and then completely washed with water. The copolymer was then subjected to vacuum drying for about 15 hours at a temperature of 40° C. The copolymer (number-average degree of polymerization of 230) was in the form of a slightly yellow powder and easily dissolved in solvents such as ethane tetrachloride, chloroform and the like. FIG. 1 shows an infrared absorption spectrum of a cast film prepared from a chloroform solution of the copolymer.

The copolymer powder thus obtained (15 parts) was then added to 100 parts of polyvinylidene fluoride powder (degree of polymerization of about 1000) which was manufactured by Kureha Kagaku Kogyo K.K., Japan, and marketed under the trade name "Kureha KF Polymer #1000." These components were thoroughly mixed by means of a Henschel mixer. This mixture was amply kneaded by means of a roll mill at a temperature of 175° C. The kneaded mixture was treated at a temperature of 250° C. under a pressure of 100 kg/cm$^2$ by using a press wherein heat and pressure were applied to form a pressed sheet of 0.4 mm in thickness.

The resulting pressed sheet was stretched in a first direction at a temperature of 155° C. and then stretched in the direction perpendicular to the first direction to form a stretched sheet of 25 microns in thickness. The monomer (A) constituent unit was $6.2 \times 10^{-3}$ moles per square meter of the light-receiving surface of the film. FIG. 2 indicates measured results of the transmittances of ultraviolet rays and visible rays obtained by means of a spectrophotometer. In FIG. 2, curve 1 represents the ultraviolet absorption curve of a film according to the present invention, and curve 2 represents the ultraviolet absorption curve of a film composed of polyvinylidene fluoride alone.

As is apparent from FIG. 2, the resulting film of the present invention has excellent transparency (83% at 500 m$\mu$) as compared with the film obtained by using polyvinylidene fluoride alone (transparency of 80% at 500 m$\mu$). It was indicated that the film of the present invention completely shielded off ultraviolet rays at wavelengths of from 210 to 390 millimicrons according to measurements carried out by means of a spectrophotometer for ultraviolet rays. Incidentally, the film obtained from polyvinylidene fluoride homopolymer exhibited 80% of transmittance at 385 millimicrons.

EXAMPLE 2 AND COMPARISON EXAMPLE 2-(2'-hydroxy-4'-methacryloxyphenyl)benzotriazole (monomer A-2)) was formed in the same manner as that described in the Preparation Example except that orthonitroaniline was substituted for 2-nitro-5-chloroaniline. While the mononer (A-2) thus obtained can be copolymerized with the mononer (B) in various proportions, in this non-limiting example, the weight ratio of the monomer (A-2) to the monomer (B) is 1:5 (the molar ratio is 1:12.6).

The polymerization was carried out in the same manner as that of Example 1 except that the type of the monomer (A) and the ratio of the monomer (A) to monomer (B) to be copolymerized were different.

The high-molecular-weight ultraviolet absorber thus obtained (number-average degree of polymerization of 320) in a quantity of 50 parts was blended with 100 parts of polyvinylidene fluoride (degree of polymerization of 1100). This blend was pressed at the molten state, and the pressed blend was simultaneously biaxially stretched at a temperature of 160° C. to obtain an oriented film of about 25 microns in thickness. The monomer (A-2) constituent unit was $8.9 \times 10^{-3}$ moles per square meter of the light-receiving surface of the film. The film cut off completely rays up to 385 millimicrons, and the transmittance at 500 millimicrons was 88%.

For comparison, 3 parts of a copolymer as disclosed in Japanese Patent Pub. No. 48897/1977, i.e., that obtained by copolymerizing 2-hydroxy-4-(3-methacryloxy-2-hydroxypropoxy) benzophenone with the monomer (B) in a molar ratio of 1:1, was blended with 100 parts of the polyvinylidene fluoride, and the blend was simultaneously biaxially stretched in the same manner. While the transmittance of the film thus obtained was 1.5% at 320 millimicrons, the transmittance was 50% and 74% at 380 millimicrons and 500 millimicrons, respectively. The film thus obtained was coloured slightly brown.

EXAMPLE 3

2-(2'-hydroxy-4'-methacryloxy-phenyl)-5-chlorobenzotriazole (monomer A-3)) was prepared in the same manner as that of the Preparation Example except that methacrylic chloride was substituted for acrylic chloride. While the monomer (A-3) thus obtained can be copolymerized with the monomer (B) in various proportions, an example wherein the weight ratio of the monomer (A-3) to the monomer (B) was 1:5 (the molar ratio of 1:6.59) is set forth below.

The polymerization was carried out in the same manner as that of Example 1 except that the type of the monomer (A) and the ratio between the monomers (A) and (B) to be copolymerized were different, whereby a copolymer having a number-average degree of polymerization of about 250 was obtained.

15 parts of the thus obtained high-molecular-weight ultraviolet absorber was blended with 100 parts of polyvinylidene fluoride (number-average degree of polymerization of 1000). This blend was melt-extruded with an extruder through an annular die of 80 mm in diameter and then inflated in proportions of 5 times in the longitudinal direction and 2 times in the transverse direction by the inflation method to form a film of about 25 microns in thickness.

The monomer (A-3) constituent unit in the thus obtained film was $8.9 \times 10^{-3}$ moles per square meter of the light receiving area of the film. The film cut off completly the rays up to 385 millimicrons of short wavelength ultraviolet rays and showed a transmittance 88% at 500 millimicrons.

We claim:

1. A vinylidene fluoride resin-based shaped product of a composition comprising 100 parts by weight of a vinylidene fluoride resin and from 1 to 200 parts by weight of a copolymer comprising a monomer (A) having the formula:

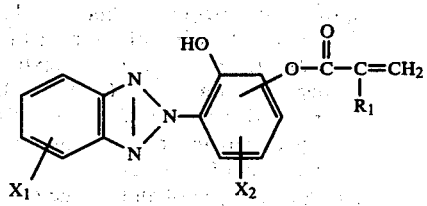

wherein $R_1$ is H or $CH_3$, and $X_1$ and $X_2$ are each a saturated hydrocarbon group containing from 1 to 4 carbon atoms, H or halogen and a monomer (B) having the formula:

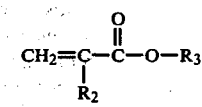

wherein $R_2$ is H or $CH_3$ and $R_3$ is a saturated hydrocarbon group containing from 1 to 5 carbon atoms, the molar ratio of the monomer (A) to the monomer (B) being not more than 1, and the monomer (A) which is a constituent unit of said copolymer being present in a quantity of at least $1 \times 10^{-4}$ moles per square meter of light-receiving area of said shaped product.

2. The shaped product as claimed in claim 1, wherein said copolymer is present in a quantity of from 2 to 100 parts by weight based on 100 parts by weight of said vinylidene fluoride resin.

3. The shaped product as claimed in claim 1, wherein said molar ratio of the monomer (A) to the monomer (B) in said copolymer is within the range of from 1/1000 to 1/2.

4. The shaped product as claimed in claim 1, wherein the number-average degree of polymerization of said copolymer is from 10 to 5000.

5. The shaped product as claimed in claim 1, wherein the monomer (A) is 2-(2'-hydroxy-4'-acryloxyphenyl)-5-chlorobenzotriazole.

6. The shaped product as claimed in claim 1, wherein the monomer (A) is 2-(2'-hydroxy-4'-methacryloxyphenyl) benzotriazole.

7. The shaped product as claimed in claim 1, wherein the monomer (A) is 2-(2'-hydroxy-4'-methacryloxyphenyl)-5-chlorobenzotriazole.

8. The shaped product as claimed in claim 1, wherein said vinylidene fluoride resin is polyvinylidene fluoride.

9. The shaped product as claimed in claim 1, wherein said shaped product is in the form of a film of from 2 to 500 microns in thickness.

* * * * *